United States Patent
Duchow

(10) Patent No.: US 10,697,862 B2
(45) Date of Patent: Jun. 30, 2020

(54) DEVICE AND METHOD FOR TAKING A SAMPLE

(71) Applicant: BAUER Spezialtiefbau GmbH, Schrobenhausen (DE)

(72) Inventor: Stephan Duchow, Gehrden (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 126 days.

(21) Appl. No.: 15/847,405

(22) Filed: Dec. 19, 2017

(65) Prior Publication Data

US 2018/0172560 A1    Jun. 21, 2018

(30) Foreign Application Priority Data

Dec. 20, 2016    (EP) ................................. 16205312

(51) Int. Cl.
| | |
|---|---|
| *G01N 1/20* | (2006.01) |
| *E02D 33/00* | (2006.01) |
| *E21B 27/00* | (2006.01) |
| *E02D 1/06* | (2006.01) |

(52) U.S. Cl.
CPC ................. *G01N 1/20* (2013.01); *E02D 1/06* (2013.01); *E02D 33/00* (2013.01); *E21B 27/00* (2013.01)

(58) Field of Classification Search
CPC .. G01N 1/20; E02D 1/06; E02D 33/00; E02D 1/04; E02D 9/02; E21B 27/00; E21B 49/08; E21B 49/081
USPC .... 73/59, 863, 864, 864.44, 864.91, 864.31, 73/864.74
See application file for complete search history.

(56) References Cited

U.S. PATENT DOCUMENTS

| | | | | |
|---|---|---|---|---|
| 4,807,707 A | * | 2/1989 | Handley | .................. E21B 7/26 175/20 |
| 5,358,057 A | * | 10/1994 | Peters | ...................... E21B 7/26 166/163 |
| 5,566,576 A | * | 10/1996 | Sher | ........................ G01N 1/08 73/864.62 |
| 5,725,055 A | * | 3/1998 | Schirmer | .............. E21B 33/127 166/187 |

(Continued)

FOREIGN PATENT DOCUMENTS

| | | |
|---|---|---|
| DE | 44 29 136 A1 | 3/1995 |
| DE | 102 55 567 B3 | 1/2004 |

(Continued)

OTHER PUBLICATIONS

The extended European search report issued by the European Patent Office dated Mar. 7, 2017, which corresponds to EP 16 20 5312.

*Primary Examiner* — Randy W Gibson
*Assistant Examiner* — Gedeon M Kidanu
(74) *Attorney, Agent, or Firm* — Studebaker & Brackett PC

(57) ABSTRACT

The invention relates to a device and a method for taking a sample of a filling, with which a hole in the ground is filled, having a container with at least one inlet opening for the inflow of the filling into a receiving space of the container. According to the invention provision is made in that a closing cap is placed onto the inlet opening and this is closed thereby. The container is provided with a compressed air line which leads into the receiving space, wherein on feeding compressed air into the receiving space the closing cap is released from the inlet opening and this is exposed for the inflow of the filling.

11 Claims, 1 Drawing Sheet

(56) References Cited

U.S. PATENT DOCUMENTS

| | | | | |
|---|---|---|---|---|
| 5,902,939 | A * | 5/1999 | Ballard | E21B 49/081 |
| | | | | 73/863.12 |
| 6,339,966 | B1 * | 1/2002 | Kalidindi | G01N 1/08 |
| | | | | 73/864.31 |
| 6,393,926 | B1 * | 5/2002 | Bowersox, Jr. | B01L 3/0217 |
| | | | | 73/864.44 |
| 6,672,408 | B2 * | 1/2004 | Frantz | E02D 9/02 |
| | | | | 175/67 |
| 6,695,075 | B2 * | 2/2004 | Beeker | E02D 1/04 |
| | | | | 175/226 |
| 7,380,615 | B1 * | 6/2008 | Vanearden | A01B 1/16 |
| | | | | 111/92 |
| 2002/0194937 | A1 * | 12/2002 | Scott | E02D 1/04 |
| | | | | 73/864.91 |
| 2003/0089526 | A1 * | 5/2003 | Beeker | E02D 1/04 |
| | | | | 175/58 |

FOREIGN PATENT DOCUMENTS

| | | |
|---|---|---|
| DE | 10 2011 082 658 A1 | 3/2013 |
| DE | 10 2012 106855 A1 | 1/2014 |
| EP | 2 695 996 B1 | 10/2014 |

* cited by examiner

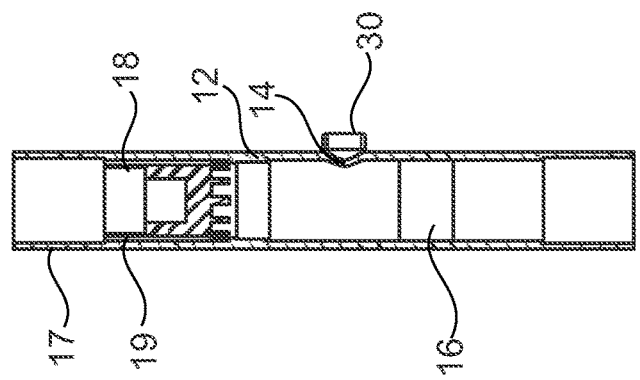
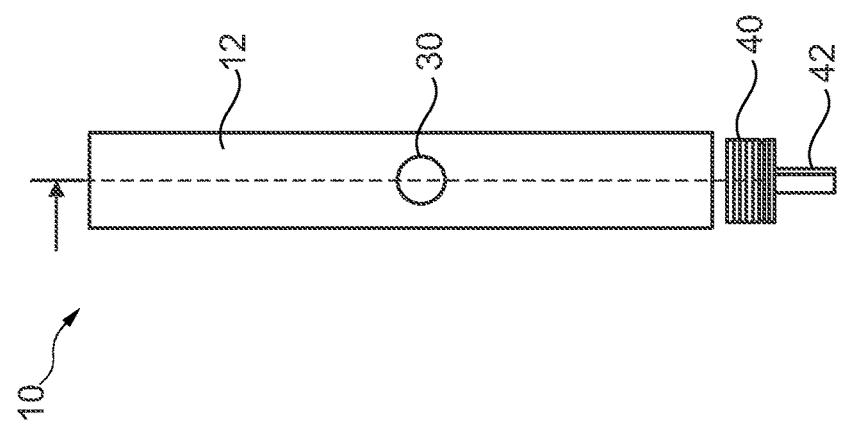
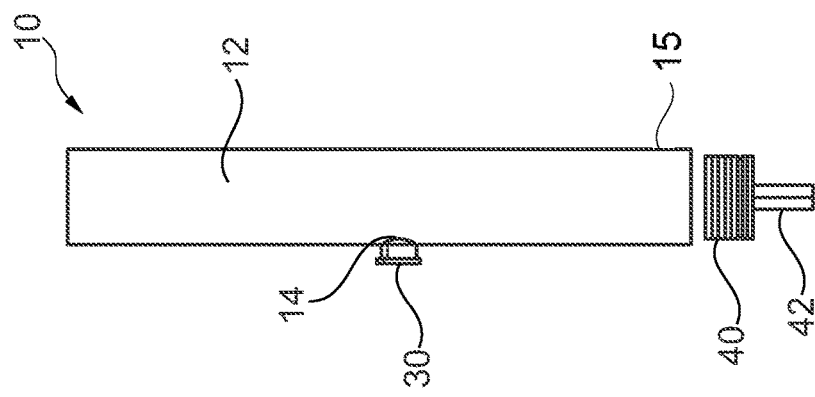
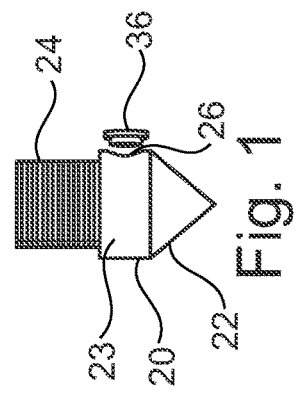

DEVICE AND METHOD FOR TAKING A SAMPLE

FIELD OF THE INVENTION

The invention relates to a device for taking a sample of a filling, with which a hole in the ground is filled, having a container with at least one inlet opening for the inflow of the filling into a receiving space of the container.

The invention further relates to a method for taking a sample of a filling, with which a hole in the ground is filled, having a container with at least one inlet opening, through which a filling flows into a receiving space of the container.

DESCRIPTION OF THE PRIOR ART

A generic device for taking samples is known from EP 2 695 996 B1. The device has a container with a hinged bottom and a hinged cover which are coupled to each other by a coupling rod. In this arrangement the container is open during sinking of the device in suspension, allowing the suspension to flow through the container. When pulled upwards the flaps close automatically so that the suspension of a particular section is enclosed in the device and can be taken as a sample.

Devices and methods of such type can be employed, in particular, in the production of bored piles or diaphragm or cut-off walls in the ground. In this process, a hole is produced in the ground which is filled with a filling, in particular a hardenable suspension.

For reasons of quality control and quality documentation it is often desirable to obtain information on the relevant medium to be hardened at certain depths of the hole. For instance, through appropriate sample taking it can be determined whether a mortar composition at a certain depth corresponds to a predetermined composition so that a reliable hardening is ensured.

From DE 10 2012 106 855 A1, DE 10 2011 082 658 A1 and DE 102 55 567 B3 devices for sample taking are known, in which an inlet opening can be closed and opened by means of an inflatable body.

The previously described devices for sample taking each have several components for opening and closing the inlet opening. To ensure the functioning as well as the quality of sample taking in the case of different holes or different hole depths a thorough and therefore laborious cleaning of the devices is necessary after each operation. This is all the more relevant given that the suspension taken as a sample usually hardens. In the event of hardening this can impair or even destroy the functionality of movable components in particular.

SUMMARY OF THE INVENTION

The invention is based on the object to provide a device and a method for taking a sample of a filling of a hole in the ground, with which a particularly efficient sample taking is rendered possible.

In accordance with the invention the object is achieved on the one hand by a device and on the other hand by a method as recited by the claims. Preferred embodiment variants of the invention are also as recited by the claims.

The device according to the invention is characterized in that a closing cap is placed onto the inlet opening and this is closed thereby and in that the container is provided with a compressed air line which leads into the receiving space, wherein on feeding compressed air into the receiving space the closing cap is released from the inlet opening and this is exposed for the inflow of the filling.

A basic idea of the invention resides in the fact that the device is designed as simple as possible and with a minimum of components. According to the invention use can be made of a simple container, the at least one inlet opening of which is closed with a closing cap. The closing cap is placed from the outside onto the inlet opening and closes this with a certain press fit. On reaching a desired depth for sample taking the closing cap is released easily by feeding compressed air via a compressed air line directly into the receiving space of the container. As a result, the closing cap is expelled from the inlet opening. The receiving space is used in its entirety as a pressure compartment that is filled with compressed air. Through the inlet opening thus opened the filling, more particularly a hardenable suspension, can flow into the container. During the inflow the compressed air inside the container is displaced upwards through the compressed air line on appropriate ventilation being present. In the case of a preferably lateral arrangement of the inlet opening on the container wall, the said opening can remain open without further ado since an exchange between the filling inside the container and the filling outside the container practically no longer takes place when the container is pulled upwards.

The device according to the invention, and in particular the receiving space, are therefore largely free of movable components and also inflatable elements so that the work involved in cleaning and maintenance is reduced considerably. The reduction of components and the simplified construction also lead to an increased lifespan of the device. By preference, an interchangeable container element is inserted in a releasable manner in the receiving space. This can be removed with the sample from the container, preferably be closed by a threaded cover and replaced by a new container element.

Basically, the closing cap can stay connected to the container via a retaining cable for example so that the closing cap can be used several times. According to an embodiment of the invention it is especially preferred that the closing cap is designed as a lost closing cap. In particular, the closing cap is designed in a cost-efficient manner of a plastic material so that, even when it has a certain oversize to produce a press fit, it can be pressed into the preferably metal outer wall of the container. The closing cap can be produced as an inexpensive mass-production part so that the costs of a replacement lie by far below the costs for a possible cleaning. The relatively small closing cap having a diameter of approximately a few centimeters can remain in the hardening filling in the hole. By preference, the closing cap can also be produced of a biodegradable material, for instance a plastic consisting biopolymers such as lignin.

Basically, the container can be shaped as any chosen hollow body. According to an embodiment variant of the invention it is especially advantageous for the container to be designed as a tubular body which has a connecting means on an upper end section for attachment of the compressed air line. From a manufacturing viewpoint a tubular body, in particular consisting of a metal, is easy to produce from a tubular basic workpiece. For connection to the compressed air line use can be made of any suitable connecting means. The compressed air line can be a hose or a tube.

According to a further development of the invention it is advantageous for the compressed air line to have a high-pressure injection rod with a thread on a lower end section and for the container to be screwed onto the thread. So-called high-pressure injection rods, also referred to as HPI-rods, are standard equipment for foundation engineering works. They serve for feeding suspensions under high pressure into the ground. At the lower end of the high-pressure injection (HPI) rod a nozzle head is screwed on. For the purpose of sample taking a nozzle head can be removed from the high-pressure injection rod and replaced by a suitably designed container of the device according to the invention. The container has an appropriate thread which corresponds to the thread on the high-pressure injection rod. The high-pressure injection rod can be moved by means of a drilling apparatus.

According to a further development easy introduction of the device pursuant to the invention is accomplished in that a tip is arranged on a lower end section of the container. By preference, the tip is fixed in a releasable manner.

In particular, according to a further development of the invention it is of advantage that on the tip a further opening is provided which is closed by a discharge plug. This at least one further opening can in particular be used as a discharge opening to discharge the sample taken from the container in a vertical arrangement. For this purpose, the container is usually positioned above a collecting element, into which the sample is discharged. The sample body, whilst still being in the flowable state or after having hardened, can then be examined and stored for documentation purposes.

According to another preferred embodiment, as an alternative or in addition to the tip provision can be made in that on a lower end section of the container a discharge valve is arranged, with which a filling taken as a sample can be discharged from the container. In the simplest case the discharge valve can be a simple stop valve that can be opened and closed. This permits quick and easy removal of the filling from the container.

A particularly advantageous embodiment variant of the invention resides in the fact that the discharge valve is designed as a non-return valve with a downward directed actuating pin. The discharge valve is in particular arranged between the container and the tip. To empty the container the tip can be removed from the container, for instance by screwing it off in the case of a customary threaded connection. In the normal state the non-return valve is closed so that the filling is initially retained in the container. In this arrangement the downward directed actuating pin projects downwards with respect to the tubular container wall. By placing the container with the downward directed actuating pin onto a removal surface the actuating pin can be pressed upwards and the non-return valve can thus be opened. Through this a particularly efficient and reliable discharge of the filling from the container is achieved. The spring-tensioned pin closes the valve again when there is no longer any pressure acting on the pin again.

The method according to the invention is characterized in that a closing cap is placed into the inlet opening of the container and the inlet opening is closed, in that the container of the device is introduced up to a desired depth into the hole, in that via a compressed air line compressed air is fed into the receiving space, wherein the closing cap is released from the inlet opening and this is exposed, in that through the inlet opening a filling flows into the receiving space of the container and in that the device with the filled container is withdrawn from the hole.

The method according to the invention is preferably carried out with the afore-mentioned device. The advantages described beforehand can be achieved thereby. In particular, the compressed air can flow freely into the receiving space of the container and, without interposition of a further component, directly expel the closing cap from the inlet opening towards the outside. After expulsion the pressure inside the receiving space can be reduced again by appropriate ventilation so that the surrounding suspension can flow as filling via the inlet opening into the container until a desired filling level is reached. The filling level can be determined by a preset inflow duration or by means of a filling level sensor. Provision can be made for a stop valve, for instance actuated by a floating gauge, whereby the ingress of suspension into the compressed air line is prevented.

According to the invention a preferred method variant resides in the fact that the container is fixed on a lower end of a high-pressure injection rod, through which compressed air is fed into the container. In a high-pressure injection rod a source of compressed air, in particular a compressor for generating compressed air, can be attached without difficulty.

Another advantageous method variant of the invention resides in the fact that the container is withdrawn from the hole with the inlet opening being open. In doing so, the inlet opening is preferably positioned in horizontal alignment on a lateral container wall. After the container has been filled at an intended depth in the hole, during subsequent withdrawal of the container from the hole practically no further filling can flow into the inlet opening so that the sample remains unchanged.

Basically, provision can also be made for several inlet openings.

BRIEF DESCRIPTION OF THE DRAWINGS

The invention is described further hereinafter by way of a preferred embodiment illustrated schematically in the drawings, wherein show:

FIG. 1 a schematic exploded view of a device according to the invention from the side;

FIG. 2 an illustration corresponding to FIG. 1 rotated by 90° and

FIG. 3 a schematic cross-sectional view of a container of the device of FIGS. 1 and 2.

DETAILED DESCRIPTION OF THE PREFERRED EMBODIMENTS

A preferred embodiment of a device 10 according to the invention with a tubular container 12 is shown in FIGS. 1 to 3. In its interior the tubular container 12 has an approximately cylindrical receiving space 16 to receive a filling as a sample. On a lower end section 15 a discharge valve 40 is arranged which is designed as a non-return valve with a downward directed actuating pin 42. By means of an appropriate threaded connection the discharge valve 40 is screwed into the lower end section 15 of the container 12 and seals the container 12 in the downward direction. In a normal operating state the discharge valve 40 is closed. By pressing the actuating pin 42 axially upwards the discharge valve 40 can be opened so that a flowable filling in the receiving space 16 can flow in the downward direction out of the container 12.

To introduce the device 10 into a hole in the ground filled with suspension a tip 20 can be arranged alternatively or additionally on the lower end section 15 of the container 12. In the illustrated embodiment the tip 20 has a lower cone section 22, a central cylinder section 23 and an upper threaded section 24 of a smaller diameter. By way of the threaded section 24 the tip 20 can be screwed in a releasable manner on the lower end section 15 into the container 12.

The tip which is of hollow design in its interior has an opening 26 in the cylinder section 23 that can be closed with a discharge plug 36. After removal of the discharge plug 36 sample material in the container 12 can flow through the opening 26 out of the receiving space 16.

On an upper end section 17 a connecting means 18 with an internal thread 19 is designed. The connecting means 18 with the internal thread 19 serves to fasten the container 12 in a releasable manner on a generally known high-pressure injection rod, not illustrated. On the high-pressure injection rod the lower nozzle tip has been removed so that in this state the container 12 can be screwed on without difficulty. Actuation of the high-pressure injection rod takes place in a known manner, for example by means of a drilling apparatus, with which the high-pressure injection rod, and consequently also the device 10, can be lowered into a hole and withdrawn again therefrom.

In a lateral area of the tubular container 12 an approximately circular inlet opening 14 is introduced. In an initial state the inlet opening 14 is closed by a closing cap 30. The closing cap 30 preferably consists of a softer material, e.g. plastic material, and can be pressed with a slight press fit into the inlet opening 14 of the container 12 preferably produced of metal, in particular steel.

For sample taking the device 10 with the high-pressure injection rod is introduced up to a desired depth into a hole with a flowable filling. On reaching the desired position for sample taking, compressed air is fed via the high-pressure injection rod through the connecting means 18 into the receiving space 16 of the container 12. In doing so, pressure is built up in the receiving space 16, through which the closing cap 30 is expelled outwards from the inlet opening 14 and the inlet opening 14 is thus exposed. Through the inlet opening 14 flowable material of the filling can then flow into the receiving space 16 up to a desired level. If appropriate ventilation is present the air inside the receiving space 16 can escape upwards via the high-pressure injection rod. On reaching the preset filling, the device 10 is withdrawn again from the hole, and according to a finding of the invention a significant exchange between the filling inside the container 12 and outside thereof no longer takes place despite the fact that the lateral inlet opening 14 is open.

Following withdrawal of the device 10 from the hole in the ground the container 12 can be unscrewed from the high-pressure injection rod and the tip 20 can then be removed. Afterwards, the actuating pin 42 on the discharge valve 40 can be pressed axially upwards and the discharge valve 40 can thus be opened. This can be implemented e.g. by placing the container 12 with the actuating pin 42 onto a basic surface of a sample receiving part. Following emptying of the receiving space 16 the container 12 can be lifted again from the basic surface, whereby the actuating pin 42 is reset, preferably through spring tension, into the initial blocking position, in which the discharge valve 40 is closed.

The device can be cleaned reliably by simply passing water through. For further sample taking the device 10 can subsequently be reassembled and screwed onto the high-pressure injection rod.

The invention claimed is:

1. A device for taking a sample of a flowable filling, with which a hole in a ground is filled, comprising:
    a container with at least one inlet opening for the inflow of the filling into a receiving space of the container, the inlet opening being laterally arranged in a wall of the container, wherein
    a closing cap is placed onto the inlet opening and this is closed thereby, the closing cap being made of plastic material and with a certain oversize to produce a press fit in the inlet opening, and
    the container is configured to be connected to a compressed air line which leads into the receiving space, wherein on feeding compressed air into the receiving space the closing cap is released from the inlet opening and this is exposed for the inflow of the filling.

2. The device according to claim 1,
wherein
the closing cap is designed as a lost closing cap.

3. The device according to claim 1,
wherein
the container is designed as a tubular body which has a connecting means on an upper end section for attachment of the compressed air line.

4. The device according to claim 1,
wherein
the compressed air line has a high-pressure injection rod with a thread on a lower end and the container is screwed onto the thread.

5. The device according to claim 1,
wherein
on a lower end section of the container a tip is arranged.

6. The device according to claim 5,
characterized in that
on the tip a further opening is provided which is closed by a discharge plug.

7. The device according to claim 1,
wherein
on a lower end section of the container a discharge valve is arranged, with which a filling taken as a sample can be discharged from the container.

8. The device according to claim 7,
wherein
the discharge valve is designed as a non-return valve with a downward directed actuating pin.

9. A method for taking the sample of the flowable filling, with which the hole in the ground is filled, in particular with the device according to claim 1, having the container with at least one inlet opening, through which the filling flows into the receiving space of the container, the inlet opening being laterally arranged in the wall of the container,
wherein
    the closing cap is placed into the inlet opening of the container and the inlet opening is closed, the closing cap being made of plastic material and with the certain oversize to produce the press fit in the inlet opening,
    the container of the device is introduced up to a desired depth into the hole, the container being configured to be connected to the compressed air line,
    via the compressed air line compressed air is fed into the receiving space, wherein the closing cap is released from the inlet opening and this is exposed,
    through the inlet opening a filling flows into the receiving space of the container and
    the device with the filled container is withdrawn from the hole.

10. The method according to claim 9,
wherein
the container is fixed on a lower end of a high-pressure injection rod, through which compressed air is fed into the container.

11. The method according to claim 9,
wherein the container is withdrawn from the hole with the inlet opening being open.

* * * * *